United States Patent [19]
Sasaki et al.

[11] Patent Number: 5,512,198
[45] Date of Patent: Apr. 30, 1996

[54] LUBRICATING COMPOSITIONS COMPRISING FLUOROALKANE REFRIGERANT, AN ESTER AND/OR POLYGLYCOL OIL, AND AN INORGANIC BORON COMPOUND

[75] Inventors: Umekichi Sasaki; Motoshi Sunami; Hiroshi Hasegawa, all of Yokohama, Japan

[73] Assignee: Nippon Oil Co., Ltd., Tokyo, Japan

[21] Appl. No.: 400,534

[22] Filed: Mar. 8, 1995

Related U.S. Application Data

[63] Continuation of Ser. No. 102,253, Aug. 5, 1993, abandoned.

[30] Foreign Application Priority Data

Aug. 5, 1992 [JP] Japan ..................... 4-208933

[51] Int. Cl.$^6$ ................. C09K 5/04; C10M 105/32; C10M 105/08
[52] U.S. Cl. ................. 252/68; 252/52 A; 252/56 R; 252/56 S; 252/49.6; 252/67; 252/69
[58] Field of Search ................. 252/68, 67, 69, 252/49.6, 56 R, 56 S, 52 A

[56] References Cited

U.S. PATENT DOCUMENTS

| | | | |
|---|---|---|---|
| 4,623,475 | 11/1986 | Enjo et al. | 252/68 |
| 5,094,768 | 3/1992 | Jolley | 252/67 |
| 5,202,037 | 4/1993 | Lavelle et al. | 252/52 R |

FOREIGN PATENT DOCUMENTS

| | | |
|---|---|---|
| 0039998 | 11/1981 | European Pat. Off. . |
| 0113045 | 11/1984 | European Pat. Off. . |
| 426153 | 5/1991 | European Pat. Off. . |
| 452816 | 10/1991 | European Pat. Off. . |
| 470788 | 1/1992 | European Pat. Off. . |
| 58-208375 | 12/1983 | Japan . |
| 5-078652 | 3/1993 | Japan . |
| 91/15551 | 10/1991 | WIPO . |

OTHER PUBLICATIONS

Database WPI, Week 8403, Derwent Publications Ltd., London, GB; AN 84–015004; JP–A–58 208 375, Dec. 1983.

*Primary Examiner*—Christine Skane
*Attorney, Agent, or Firm*—Cushman Darby & Cushman

[57] ABSTRACT

A refrigerator oil composition for a fluoroalkane refrigerant, which comprises a base oil composed principally of an oxygen-containing compound and, based on the total weight of the composition, 0.005–5.0 wt. % of a boron compound as an essential component.

12 Claims, No Drawings

LUBRICATING COMPOSITIONS COMPRISING FLUOROALKANE REFRIGERANT, AN ESTER AND/OR POLYGLYCOL OIL, AND AN INORGANIC BORON COMPOUND

This is a continuation of application Ser. No. 8/102,253, filed on Aug. 5, 1993, now abandoned.

BACKGROUND OF THE INVENTION

1. Field of the Invention

The present invention relates to refrigerator oil compositions and fluid compositions for refrigerators, said fluid compositions each being a mixture of the refrigerator oil composition and a refrigerant, and more specifically to refrigerator oil compositions and fluid compositions which are suitable for use in compression refrigerators operated using a fluoroalkane refrigerant and have excellent lubricating property.

2. Description of the Related Art

As lubricating oils for refrigerators cooled using a Cl-containing refrigerant such as CFC-12 or HCFC-22, there have been known lubricating oils containing, in addition to a base oil such as a mineral oil, alkylbenzene or a mixture thereof, a phosphate ester and/or a phosphite ester (Japanese Patent Laid-Open No. 91502/1979), trioleyl phosphate (Japanese Patent Laid-Open No. 86506/1976), a phosphite ester (Japanese Patent Laid-Open No. 139608/1979), tricresyl phosphate and/or triphenyl phosphite (Japanese Patent Laid-Open No. 27372/1980), a phosphate ester and a hydrogen phosphite ester (Japanese Patent Laid-Open No. 92799/1980), an organomolybdenum compound and an acid phosphate ester (Japanese Patent Laid-Open No. 75995/1984) or a thiophosphate (Japanese Patent Laid-Open No.293286/1986).

The lubricating oils containing a phosphite ester therein, however, have the drawback that the phosphite ester reacts with water remaining in or penetrated in a refrigerator system and forms phosphoric acid, thereby corroding metals in the system.

The lubricating oils containing a thiophosphate therein also have the drawback that thermal decomposition products of the thiophosphate corrode copper pipes in a system, windings of a motor in a hermetic-type compressor, and the like.

Such conventional additives are employed in combination with a Cl-containing refrigerant such as CFC-11, CFC-12, CFC-115 or HCFC-22. As have already been reported by Honma et al. in the Preprint D.9 (1989) of the 34-th National Meeting of Japan Society of Lubrication Engineers, chlorine atoms chemically bound with a refrigerant molecule in a large amount in the system act as an extreme pressure additive so that their function as extreme pressure additives are not particularly important. In spite of the drawbacks described above, the addition of a phosphate ester, phosphite ester, acid phosphate ester or hydrogen phosphite ester alone is sufficient for the lubricating property.

In the case of a compression refrigerator operated using a fluoroalkane refrigerant, which is a substitute for CFC refrigerants, said refrigerants being subjected to control as they are considered to lead to destruction of the ozone layer, the situation is different. Phosphate ester additives which have heretofore been effective for mineral-oil-type refrigerator oils do not show sufficient abrasion resistance when used for refrigerator oils containing a fluoroalkane refrigerant because of the following reasons:

Fluoroalkane refrigerants containing no chlorine atom or atoms in their molecules, such as HFC-32, HFC-125, HFC-134a and HFC-152a, however, have no effects as an extreme pressure additive.

Refrigerator oils for a fluoroalkane refrigerant employ a base oil having strong polarity such as oxygen-containing synthetic oils, ex. a carboxylate ester oil, polyglycol oil or carbonate ester oil, in view of their miscibility with the refrigerant so that the effects of the extreme pressure additive so added are lowered.

For weight reduction and energy saving, aluminum alloys (hereinafter called "aluminum" for the sake of brevity) have come to be used frequently for the sliding parts of the compressors of recent automobile air-conditioning systems. Although there have appeared iron-aluminum or aluminum-aluminum sliding parts accompanied with such a tendency, extreme pressure additives suitable for them have not yet been studied sufficiently.

SUMMARY OF THE INVENTION

The present inventors have proceeded with an extensive investigation on lubricating property when a fluoroalkane is used as a refrigerant and an ester oil, polyalkylene glycol oil or the like is used as a refrigerator oil. As a result, it has been found that a refrigerator oil composition capable of exhibiting excellent abrasion resistance and therefore practically usable can be obtained by incorporating a boron compound in the refrigerator oil.

An object of the present invention is to overcome the drawback of a refrigerator oil composed of, as a base oil, an oxygen-containing compound such as an ester oil, neo-acid ester oil, carbonate ester oil or polyalkylene glycol oil, namely, its poor lubricating property and to provide a refrigerator oil composition which has excellent abrasion resistance and is useful in a refrigerant-compression type refrigerator employing a fluoroalkane as a refrigerant and a fluid composition for refrigerators which fluid composition is a mixture of said refrigerator oil composition and a refrigerant.

The present invention therefore provides a refrigerator oil composition for a fluoroalkane refrigerant which comprises a base oil composed principally of an oxygen-containing compound and 0.005–5.0 wt. %, based on the total weight of the composition, of a boron compound as an essential component.

In addition, the present invention provides a fluid composition for refrigerators which comprises 1–500 parts by weight of the refrigerator oil composition and 100 parts by weight of a refrigerant composed of a fluoroalkane.

DETAILED DESCRIPTION OF THE INVENTION

The base oil contained in the refrigerator oil composition according to the present invention is composed principally of an oxygen-containing compound. Any oxygen-containing compound is usable as long as it can be employed as a base oil in refrigerator oils. Specific examples of the compound include esters, polyglycols, polyphenyl ethers, silicates, polysiloxane and perfluoroether. Among them, esters and polyglycols are particularly preferred.

Exemplary esters include dibasic acid esters, polyol esters, complex esters and polyol carbonate esters.

Exemplary dibasic acid esters include esters of $C_{5-10}$ dibasic acids, such as glutaric acid, adipic acid, pimelic acid, suberic acid, azelaic acid and sebacic acid, and linear- or branched-alkyl-containing $C_{1-15}$ monohydric alcohols such as methanol, ethanol, propanol, butanol, pentanol, hexanol, heptanol, octanol, nonanol, decanol, undecanol, dodecanol, tridecanol, tetradecanol and pentadecanol. Specific examples include ditridecyl glutarate, di-2-ethylhexyl adipate, diisodecyl adipate, ditridecyl adipate and di-3-ethylhexyl sebacate.

As polyol esters, esters of diols or polyols containing 3–20 OH groups and $C_{6-20}$ fatty acids can be used preferably. Specific examples of diols include ethylene glycol, 1,3-propanediol, propylene glycol, 1,4-butanediol, 1,2-butanediol, 2-methyl-1,3propanediol, 1,5-pentanediol, neopentyl glycol, 1,6hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9nonanediol, 1,10-decanediol, 1,11-undecanediol and 1,12-dodecanediol. Specific examples of polyols include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerins (dimer to eicosamer of glycerin), 1,3,5-pentanetriol, sorbitol, sorbitane, sorbitol-glycerin condensates, adonitol, arabitol, xylitol and mannitol; saccharides such as xylose, arabinose, ribose, rhamnose, glucose, fructose, galactose, mannose, sorbose, cellobiose, maltose, isomaltose, trehalose, sucrose, raffinose, gentianose and melezitose; partially-etherified products thereof; and methyl glycoside (glycoside). Illustrative fatty acids include linear or branched fatty acids such as hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid and oleic acid; and so-called neo-acids having a quaternary α-carbon atom. These polyol esters may contain one or more free hydroxyl groups. Particularly preferred examples of polyol esters include esters of hindered alcohols such as neopentyl glycol, trimethylolethane, trimethylolpropane, trimethylolbutane, di-(trimethylolpropane), tri-(trimethylolpropane), pentaerythritol, di-(pentaerythritol) or tri-(pentaerythritol). Specific examples include trimethylolpropane caprylate, trimethylolpropane pelargonate, pentaerythritol 2-ethylhexanoate and pentaerythritol pelargonate.

The term "complex ester" as used herein means an ester of a monohydric alcohol and polyol with a fatty acid and a dibasic acid. As the fatty acid, dibasic acid, monohydric alcohol and polyol, those exemplified above with respect to the dibasic acid ester and polyol ester can be used.

The polyol carbonate ester is an ester of a carbonic acid and a polyol. As illustrative polyols, those exemplified above with respect to the polyol ester, polyglycols obtained by homo- or co-polymerization of diols as well as those obtained by adding a polyglycol to the polyols exemplified above can be used.

Preferred examples of the polyglycol include polyalkylene glycols, etherified polyalkylene glycols and modified compounds thereof. As polyalkylene glycols, those obtained by homo- or co-polymerization of diols can be used. Usable as diols are those exemplified above with respect to the polyol ester as well as polyalkylene glycols with their hydroxyl group or groups etherified. Specific examples of the groups to be introduced for the etherification of polyalkylene glycols include monomethyl ether, monoethyl ether, monopropyl ether, monobutyl ether, monopentyl ether, monohexyl ether, monoheptyl ether, monooctyl ether, monnonyl ether, monodecyl ether, dimethyl ether, diethyl ether, dipropyl ether, dibutyl ether, dipentyl ether, dihexyl ether, diheptyl ether, dioctyl ether, dinonyl ether and didecyl ether. Illustrative modified compounds of polyglycols include polyol-polyalkylene-glycol adducts and etherified products thereof. In this case, the polyols exemplified above with respect to the polyol ester can be used. Incidentally, when the polyalkylene glycol has been obtained by the copolymerization of diols having different structures, no particular limitation is imposed on the manner of polymerization of oxyalkylene groups. The oxyalkylene groups may be copolymerized either at random or in blocks.

Although no particular limitation is imposed on the molecular weight of each polyglycol used in the composition of the invention, one having a number average molecular weight of 200–4,000 can be used preferably to further improve the sealing of compressors, with a polyglycol having an average molecular weight of 300–3,000 being more preferred.

The oxygen-containing compounds described above can be used either singly or in combination. The kinematic viscosity of the oxygen-containing compound in the present invention is 2–150 cSt, preferably 4–100 cSt, at 100° C.

In the composition according to the present invention, the above oxygen-containing compounds can each be used alone as a base oil. Alternatively, the oxygen-containing compound and optionally a mineral oil, a synthetic oil or the like which is employed in refrigerator oils for chlorine-containing refrigerants such as CFC-12 and HCFC-22 can be used in combination as a base oil. As mineral oils, paraffin mineral oils, naphthene mineral oils and the like can be used. They are obtained by subjecting a lubricating oil fraction, which has been obtained by atmospheric distillation and vacuum distillation of a crude oil, to a suitable combination of refining treatment steps such as solvent deasphalting, solvent extraction, hydrogenolysis, solvent dewaxing, catalytic dewaxing, hydrorefining, sulfuric acid treatment and clay treatment. As synthetic oils, known poly-α-olefins such as polybutene, 1-octene oligomer and 1-decene oligomer; alkylbenzenes, alkyl-naphthalenes and mixtures of at least two of them are usable. In this case, it is desirable that the oxygen-containing compound is contained in an amount of at least 50 wt. %, preferably at least 70 wt. %, based on the total amount of the base oil. The preferred dynamic viscosity of the base oil ranges from 2.0 cSt to 150 cSt at 100° C.

The composition according to the present invention should comprise the base oil described above and, based on the total amount of the composition, 0.005–5.0 wt. %, preferably 0.01–2.0 wt. % of a boron compound. If the content of the boron compound is smaller than the above range, the resultant lubricating oil will be less effective for the improvement of abrasion resistance. Even if the content exceeds the above range, on the other hand, the resultant lubricating oil will not show improving effects in proportion to the increase in the content. Contents outside the above range, therefore, are not preferred.

The boron compound may be incorporated in the base oil only by mixing. Alternatively, it can be incorporated by dissolving or dispersing the boron compound of the present invention in a solvent beforehand in order to heighten its solubility in the base oil and then mixing the resultant solution or dispersion with the base oil. Examples of the solvent include monohydric alcohols, glycols and cellosolves. Specific examples include methyl alcohol, ethyl alcohol, propyl alcohol, isopropyl alcohol, n-butyl alcohol, isobutyl alcohol, s-butyl alcohol, t-butyl alcohol, pentyl alcohol, hexyl alcohol, heptyl alcohol, octyl alcohol, nonyl alcohol, decyl alcohol, ethylene glycol, diethylene glycol, triethylene glycol, propylene glycol, dipropylene glycol, tripropylene glycol, glycerin, ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, diethylene glycol monomethyl ether, diethylene glycol dimethyl ether, diethylene glycol monoethyl ether, diethylene glycol diethyl ether, diethylene glycol monopropyl ether, diethylene glycol dipropyl ether, diethylene glycol monobutyl ether, diethylene glycol dibutyl ether, triethylene glycol monomethyl ether, triethylene glycol dimethyl ether, triethylene glycol monoethyl ether, triethylene glycol diethyl ether, triethylene glycol monopropyl ether, triethylene glycol dipropyl ether, triethylene glycol monobutyl ether, triethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, dipropylene glycol monomethyl ether, dipropylene glycol dimethyl ether, dipropylene glycol monoethyl ether, dipropylene glycol diethyl ether, dipropylene glycol monopropyl ether, dipropylene glycol dipropyl ether, dipropylene glycol monobutyl ether, dipropylene glycol dibutyl ether, tripropylene glycol monomethyl ether, tripropylene glycol dimethyl ether, tripropylene glycol monoethyl ether, tripropylene glycol diethylether, tripropyleneglycol monopropyl ether, tripropylene glycol dipropyl ether, tripropylene glycol monobutyl ether and tripropylene glycol dibutyl ether.

Upon using the solvent, the boron compound according to the present invention may be mixed as needed with the solvent. For example, the boron compound can be mixed in an amount of 0.1–50 wt. %, preferably 1–10 wt. % based on the total amount of the solvent and the boron compound.

Examples of the boron compound usable in the present invention include compounds obtained by modifying nitrogen-containing compounds—such as dibasic acid imides, aminoamides, benzylamines and polyalkenyl-amines— and higher alcohol ester compounds with a boric acid, respectively; boric acid esters; alkali metal salts, alkaline earth metal salts and ammonium salts of a boric acid; oil soluble salts containing alkali metal borate therein; and mixtures thereof.

As the dibasic acid imide, succinic acid imide and derivatives thereof are preferred. Specific examples of the dibasic acid imide include those obtained by reacting a polyolefin, such as polybutene, having a molecular weight of 300–3000 with maleic anhydride and then imidating the reaction mixture with a polyamine such as tetraethylene pentamine; and those obtained by acting the imide so obtained with an aromatic polycarbonic acid such as phthalic acid, trimellitic acid and pyromellitic acid and then partially amidating the remaining amino groups. Those imidated using a polyamine include two types, that is, a mono-type wherein maleic anhydride has been added to either end of the polyamine and a bis-type wherein maleic anhydride has been added to each end of the polyamine.

Examples of the aminoamide include polyalkylene polyamines each of which have been partially amidated with a fatty acid.

Illustrative benzylamines include those prepared by so-called Mannich reaction, that is, by reacting a polyolefin, such as polypropylene oligomer or polybutene, having a molecular weight of 300–3000 with phenol to yield alkyl phenol and then reacting the resultant alkylphenol with formaldehyde and a polyamine.

Examples of the polyalkenyl amine include those obtained by chlorinating a polyolefin having a molecular weight of 300–3000 such as polybutene and then reacting the chlorinated polyolefin with ammonia, a polyamine or the like.

Examples of the higher alcohol ester compounds include esters of $C_{8-20}$ higher alcohols with $C_{8-20}$ higher fatty acids. Specific examples of the $C_{8-20}$ higher alcohol include octyl alcohol, nonyl alcohol, decyl alcohol, undecyl alcohol, dodecyl alcohol, tridecyl alcohol, tetradecyl alcohol, pentadecyl alcohol, hexadecy alcohol, heptadecyl alcohol, octadecyl alcohol, nonadecyl alcohol and eicosyl alcohol. Examples of the $C_{8-20}$ fatty acid include octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid and eicosanoic acid.

Usable as boron compounds in the present invention are those obtained by reacting a nitrogen-containing compound such as the dibasic acid imide, aminoamide, benzylamine and polyalkenyl amine each of which have been exemplified above, a higher alcohol ester or the like with a boric acid, borate or boric acid ester, that is, by conducting modification with a boric acid.

Specific examples of the boric acid usable upon the modification include orthoboric acid, metabolic acid and tetraboric acid.

Specific examples of the borate usable upon the modification include alkali metal salts, alkaline earth metal salts and ammonium salts of a boric acid, and more specifically lithium borates such as lithium metaborate, lithium tetraborate, lithium pentaborate and lithium perborate; sodium borates such as sodium metaborate, sodium diborate, sodium tetraborate, sodium pentaborate, sodium hexaborate and sodium octaborate; potassium borates such as potassium metaborate, potassium tetraborate, potassium pentaborate, potassium hexaborate and potassium octaborate; calcium borates such as calcium metaborate, calcium diborate, tricalcium tetraborate, pentacalcium tetraborate and calcium hexaborate; magnesium borates such as magnesium metaborate, magnesium diborate, trimagnesium tetraborate, pentamagnesium tetraborate and magnesium hexaborate; and ammonium borates such as ammonium metaborate, ammonium tetraborate, ammonium pentaborate and ammonium octaborate.

Specific examples of boric acid esters usable upon the modification include esters of a boric acid and, preferably, a $C_{1-6}$ alkylalcohol. Specific examples include monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate.

As boric acid esters, which are the boron compounds according to this invention, boric acid esters with a $C_{8-20}$ higher monoalcohol and those with a $C_{8-20}$ higher polyhydric alcohol can be employed. Specific examples of the ester include boric acid monoesters, boric acid diesters and boric acid triesters with a higher monoalcohol such as octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, nonadecyl alcohol and eicosyl alcohol; those with a higher polyhydric alcohol such as octanediol, nonanediol, decanediol, undecanediol, dodecanediol, tridecanediol, tetradecanediol, pentadecanediol, hexadecanediol, heptadecanediol, octadecanediol, nonadecanediol, eicosanediol, octanetriol, nonanetriol, decanetriol, undecanetriol, dodecanetriol, tridecanetriol, tetradecanetriol, pentadecanetriol, hexadecanetriol, heptadecanetriol, octadecanetriol, nonadecanetriol and eicosanetriol; and mixtures thereof.

Specific examples of the alkali metal salt, alkaline earth metal salt and ammonium salt of a boric acid, which are also the boron compounds according to the present invention, include lithium borate such as lithium metaborate, lithium tetraborate, lithium pentaborate and lithium perborate; sodium borates such as sodium metaborate, sodium diborate, sodium tetraborate, sodium pentaborate, sodium hexaborate and sodium octaborate; potassium borates such as potassium metaborate, potassium tetraborate, potassium pentaborate, potassium hexaborate and potassium octaborate; calcium borates such as calcium metaborate, calcium diborate, tricalcium tetraborate, pentacalcium tetraborate and calcium hexaborate; magnesium borates such as magnesium metaborate, magnesium diborate, trimagnesium tetraborate, pentamagnesium tetraborate and magnesium hexaborate; ammonium borates such as ammonium metaborate, ammonium tetraborate, ammonium pentaborate and ammonium octaborate; and mixtures thereof. Any of these compounds whether they contain water of crystallization or not are usable. As described above, it is desired to employ, as the boron compound of the present invention, the alkali metal salt, alkaline earth metal salt or ammonium salt of a boric acid after being dissolved or dispersed in a solvent to improve its solubility in a base oil.

Examples of the oil-soluble salt containing an alkali (alkaline earth) metal borate, said soluble-salt also being the boron compound according to the present invention, include those obtained by reacting a neutral alkali (alkaline earth) metal salt of an oil-soluble organic acid—such as alkali (alkaline earth) metal sulfonates, alkali (alkaline earth) metal salicylates, alkali (alkaline earth) metal phenates and alkali (alkaline earth) metal carboxylates—with a boric acid, borate or boric acid ester in the presence of an alkali (alkaline earth) metal base and those obtained by reacting a basic alkali (alkaline earth) metal salt of an oil-soluble organic acid—such as overbasic alkali (alkaline earth) metal sulfonates, alkali (alkaline earth) metal salicylates, alkali (alkaline earth) metal phenates and alkali (alkaline earth) metal carboxylates—with a boric acid, borate or borate ester.

Examples of the alkali metal include lithium, sodium and potassium, those of the alkaline earth metal include magnesium, calcium and barium, and those of the alkali (alkaline earth) metal base include hydroxides and oxides of the alkali (alkaline earth) metal. As the boric acid, borate and boric acid ester, compounds similar to those employed upon the boric-acid-modification of the nitrogen-containing compound or higher-alcohol ester which have been described above can be used.

To improve the performance of the refrigerator oil composition of the present invention, the composition can be added with one or more of additives, for example, scavengers for acid substances and/or active substances such as free radicals, e.g., phenyl glycidyl ether, butylphenylglycidyl ether, nonylphenyl glycidyl ether and epoxy compounds such as epoxylated vegetable oils; phenol-type and amine-type antioxidants; extreme pressure additives such as phosphate esters, phosphite esters, acid phosphate esters, hydrogen phosphite esters, chlorides of phosphate esters, phosphite esters, acid phosphate esters, hydrogen phosphite esters and hydrogen phosphite esters, and amine salts thereof; oiliness improvers such as higher alcohols, higher fatty acids and fatty acid esters; metal deactivators such as benzotriazole. The additives described above can be used either singly or in combination.

Specific examples of the refrigerant usable in combination with the refrigerator oil composition of the present invention include fluoroalkane refrigerants such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,2-trifluoroethane (HFC-143), 1,1,1trifluoroethane (HFC-143a), 1,1-difluoroethane (HFC152a) and a mixture of at least two of them.

When a refrigerator oil composition according to the present invention is used in a refrigerator, it is ordinarily used in the form of a fluid composition containing the above refrigerant mixed therein. No particular limitation is imposed on their mixing ratio, however, it is desirable to use, in a mixed state, 1–500 parts by weight, preferably 2–400 parts by weight of the refrigerator oil composition per 100 parts by weight of the refrigerant.

The refrigerator oil compositions according to the invention can be widely used in apparatuses employing a refrigerant-compression type refrigerator, such as refrigerators, freezing chambers, automatic vending machines, display cases, room air conditioners, car air conditioners, dehumidifiers and chemical plants.

The present invention will next be described in detail by the following Examples and Comparative Examples. It should however be borne in mind that this invention is by no means limited to or by the examples.

(Examples 1–22 & Comparative Examples 1–8)

The following are the boron compounds and base oils employed in Examples and Comparative Examples of the present invention.

Compound A: Succinic acid imide modified with boric acid

Compound B: A mixture of boric acid esters with $C_{16}$ and $C_{18}$ alcohols ($C_{16}$:$C_{18}$=50:50 mole %)

Compound C: Tribenzyl borate

Compound D: Potassium tetraborate ($K_2B_4O_7 \cdot 4H_2O$) (employed in the form of a 5 wt. % solution in propylene glycol)

TCP: Tricresyl phosphate

TOP: Trioctyl phosphate

OAL: Oleyl alcohol

STA: Stearic acid

MOE: Methyl oleate

Ester oil: A tetraester mixture of pentaerythritol with 2-methylhexanoic acid and 2-ethylhexanoic acid (75 mole % of 2-methyl hexanoic acid+25 mole % of 2-ethyl hexanoic acid)

PAG: Polyoxypropylene glycol monomethyl ether (average molecular weight: 1300).

Modified PAG: Polyoxypropylene glycol, α,ω-diethylcarbonate (average molecular weight: 2,000)

The compositions of Examples and Comparative Examples are shown in Table 1. Each of them was subjected to a wear test. The results of the test are summarized in Table 1.

(Wear Test)

Each refrigerator oil composition and HFC-134a refrigerant were weighed in a high-pressure vessel. The latter, HFC-134a, was weighed to give the refrigerant pressure of 10 kgf/cm². A wear test was conducted in the vessel by employing a disc-shaped test piece and vanes in combination. A set of three vanes was radially installed in contact with the test piece and was rotated. The disc-shaped test piece was fixed on the bottom of vessel and a load was applied upwardly from the bottom of the disc by hydraulic pressure.

As the test piece, aluminum (AC8A) and iron (SUJ2) were used.

The test was conducted at 80° C. for one hour at the rotational speed of 3,000 rpm. After the completion of the test, wear resistance was evaluated in accordance with the wear loss (mg) of the vanes.

TABLE 1

(1)

| Example | Base Oil | Additive (wt. %) | | Wear loss (mg) of vanes after wear test | |
|---|---|---|---|---|---|
| | | | | (1) | (2) |
| Ex. 1 | Ester oil | Compound A | (0.05) | 11 | 6.2 |
| Ex. 2 | Ester oil | Compound A TCP | (0.05) (1.0) | 2.8 | 3.2 |
| Ex. 3 | Ester oil | Compound A | (5.0) | 10 | 1.4 |
| Ex. 4 | Ester oil | Compound A | (0.5) | 11 | 2.0 |
| Ex. 5 | Ester oil | Compound B | (0.5) | 12 | 3.5 |
| Ex. 6 | Ester oil | Compound C | (0.5) | 9 | 2.5 |
| Ex. 7 | Ester oil | Compound D | (0.01, as an actual concentration) | 18 | 3.2 |
| Ex. 8 | PAG | Compound A | (0.5) | 18 | 2.2 |
| Ex. 9 | PAG | Compound B | (0.5) | 17 | 3.8 |
| Ex. 10 | PAG | Compound C | (0.5) | 19 | 2.7 |
| Ex. 11 | PAG | Compound A TCP | (0.5) (1.0) | 1.7 | 2.1 |
| Ex. 12 | PAG | Compound A TOP | (0.5) (1.0) | 2.0 | 2.0 |
| Ex. 13 | PAG | Compound A STA | (0.5) (3.0) | 4.2 | 2.1 |
| Ex. 14 | PAG | Compound A MOE | (0.5) (3.0) | 5.1 | 1.8 |
| Ex. 15 | PAG | Compound A | (0.01, as an actual concentration) | 19 | 4.2 |

(2)

| Example/ Comp.Ex. | Base Oil | Additive (wt. %) | | Wear loss (mg) of vanes after wear test | |
|---|---|---|---|---|---|
| | | | | (1) | (2) |
| Ex. 16 | Modified PAG | Compound A | (0.05) | 17 | 4.6 |
| Ex. 17 | Modified PAG | Compound A | (0.5) | 15 | 2.2 |
| Ex. 18 | Modified PAG | Compound A | (5.0) | 15 | 1.8 |
| Ex. 19 | Modified PAG | Compound B | (0.1) | 15 | 3.0 |
| Ex. 20 | Modified PAG | Compound C | (0.1) | 17 | 2.8 |
| Ex. 21 | Modified PAG | Compound C TCP | (0.1) (1.0) | 2.2 | 2.7 |
| Ex. 22 | Modified PAG | Compound D as an actual concentration | (0.01 | 18 | 2.5 |
| Comp.Ex. 1 | Ester oil | | | 18 | 21 |

TABLE 1-continued

| Comp.Ex. 2 | Ester oil | TCP | (1.0) | 11 | 25 |
|---|---|---|---|---|---|
| Comp.Ex. 3 | PAG | | | 20 | 25 |
| Comp.Ex. 4 | PAG | TCP | (1.0) | 13 | 28 |
| Comp.Ex. 5 | PAG | OAL | (3.0) | 15 | 20 |
| Comp.Ex. 6 | PAG | MOE | (3.0) | 18 | 24 |
| Comp.Ex. 7 | Modified PAG | | | 18 | 19 |
| Comp.Ex. 8 | Modified PAG | TCP | (1.0) | 10 | 22 |

(1) Vane (iron: SUJ2) and disc (aluminum: AC8A) combination
(2) Vane (aluminum: AC8A) and disc (aluminum: AC8A) combination As can be understood from Comparative Examples 2, 4 and 8, when TCP was added, the wear loss of iron decreased but that of aluminum showed a rather increasing tendency. When the boron compound A or D according to the present invention was incorporated as shown in Examples, on the other hand, the wear loss of aluminum was extremely small. Even the combined use of the compound with TCP reduced the wear loss of iron without increasing that of aluminum.

As can be seen from Comparative Examples 5 and 6, OAL, MOE and the like which have heretofore been employed as an oiliness improver or friction controller for engine oils did not show any effect even if added to a compression type refrigerator oil which is composed of an oxygen-containing base oil and used in the form of a mixture with a fluoroalkane refrigerant. It is apparent, however, that the combined use of the boron compound according to the present invention brought about effects for abrasion resistance.

As described above, the refrigerator oil composition according to the present invention is excellent with small wear loss even in the presence of a fluoroalkane.

What is claimed is:

1. A fluid composition for a refrigerator, which comprises (A) 100 parts by weight of a fluoroalkane refrigerant selected from the group consisting of difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,2-trifluoroethane (HFC-143), 1,1,1,-trifluoroethane (HFC-143a) and 1,1,-difluoroethane (HFC-152a), and (B) 1–500 parts by weight of the refrigerator oil composition, which comprises (a) a base oil composed principally of an oxygen-containing compound selected from the group consisting of dibasic acid esters, polyol esters, complex esters, polyol carbonate esters, polyglycols and mixtures thereof, (b) 0,005–5.0 wt. %, based on the total weight of the refrigerator oil composition, of a boron compound selected from the group consisting of alkali metal borates, alkali earth metal borates, ammonium borates and mixtures thereof, and (c) 0.1–50 wt. %, based on the total weight of (b) and (c), of a solvent selected from the group consisting of monohydric alcohols, glycols, cellosolves and mixtures thereof.

2. A fluid composition of claim 1, wherein the polyglycol is selected from the group consisting of polyalkyleneglycols, etherified polyalkyleneglycols and modified compounds thereof.

3. A fluid composition of claim 1, wherein the oxygen-containing compound amounts to 50 wt. % of the whole base oil.

4. A fluid composition of claim 1, wherein the oxygen-containing compound amounts to 70 wt. % of the whole base oil.

5. A fluid composition of claim 1, wherein the boron compound is contained in an amount of 0.01–2.0 wt. % based on the total weight of the refrigerator oil composition.

6. A fluid composition of claim 1, wherein the solvent is selected from the group consisting of methyl alcohol, ethyl alcohol, propyl alcohol, isopropyl alcohol, n-butyl alcohol, isobutyl - alcohol, s-butyl alcohol, t-butyl alcohol, pentyl alcohol, hexyl alcohol, heptyl alcohol, octyl alcohol, nonyl alcohol, decyl alcohol, ethylene glycol, diethylene glycol, triethylene glycol, propylene glycol, dipropylene glycol, tripropylene glycol,glycerin, ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, diethylene glycol monomethyl ether, diethylene glycol dimethyl ether, diethylene glycol monoethyl ether, diethylene glycol diethyl ether, diethylene glycol monopropyl ether, diethylene glycol dipropyl ether, diethylene glycol monobutyl ether, diethylene glycol dibutyl ether, triethylene glycol monomethyl ether, triethylene glycol dimethyl ether, triethylene glycol monoethyl ether, triethylene glycol diethyl ether, triethylene glycol monopropyl ether, triethylene glycol dipropyl ether, triethylene glycol monobutyl ether, triethylene glycol ibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, dipropylene glycol monomethyl ether, dipropylene glycol dimethyl ether, dipropylene glycol monoethyl ether, dipropylene glycol diethyl ether, dipropylene glycol monopropyl ether, dipropylene glycol dipropyl ether, dipropylene glycol monobutyl ether, dipropylene glycol dibutyl ether, tripropylene glycol monomethyl ether, tripropylene glycol dimethyl ether, tripropylene glycol monoethyl ether, tripropylene glycol diethylether, tripropyleneglycol monopropyl ether, tripropylene glycol dipropyl ether, tripropylene glycol monobutyl ether and tripropylene glycol dibutyl ether.

7. A method for improving lubrication in a refrigerator using a fluoroalkane refrigerant selected from the group consisting of difluoromethane (HFC-32), trifluoromethane (HFC-23), pentafluoroethane (HFC-125), 1,1,2,2- tetrafluoroethane (HFC-134), 1,1,1,2 tetrafluoroethane (HFC-134a), 1,1,2-trifluoroethane (HFC-143), 1,1,1,-trifluoroethane (HFC-143a) and 1,1, difluoroethane (HFC-152a), said method comprising using in said refrigerator a refrigerator oil composition, which comprises (a) a base oil composed principally of an oxygen-containing compound selected from the group consisting of dibasec acid esters, polyol esters, complex esters, polyol carbonate-esters, polyglycols and mixtures thereof, (b) 0.005–5.0 wt. %, based on the total weight of the refrigerator oil composition, of a boron compound selected from the group consisting of alkali metal borates, alkali earth metal borates, ammonium borates and mixtures thereof, and (c) 1.0–50 wt. %, based on the total weight of (b) and (c), of a solvent selected from the group consisting of monohydric alcohols, glycols, cellosolves and mixtures thereof.

8. A method according to claim 7, wherein the polyglycol is selected from the group consisting of polyalkyleneglycols, etherified polyalkyleneglycols and modified compounds thereof.

9. A method according to claim 7, wherein the oxygen-containing compound amounts to 50 wt. % of the whole base oil.

10. A method according to claim 7, wherein the oxygen-containing compound amounts to 70 wt. % of the whole base oil.

11. A method according to claim 7, wherein the boron compound is contained in an amount of 0.01–2.0 wt. % based on the total weight of the refrigerator oil composition.

12. A method according to claim 7, wherein the solvent is selected from the group consisting of methyl alcohol, ethyl alcohol, propyl alcohol, isopropyl alcohol, n-butyl alcohol, isobutyl alcohol, s-butyl alcohol, t-butyl alcohol, pentyl alcohol, hexyl alcohol, heptyl alcohol, octyl alcohol, nonyl alcohol, decyl alcohol, ethylene glycol, diethylene glycol, triethylene glycol, propylene glycol, dipropylene glycol, tripropylene glycol, glycerin, ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, diethylene glycol monomethyl ether, diethylene glycol dimethyl ether, diethylene glycol monoethyl ether, diethylene glycol diethyl ether, diethylene glycol monopropyl ether, diethylene glycol dipropyl ether, diethylene glycol monobutyl ether, diethylene glycol dibutyl ether, triethylene glycol monomethyl ether, triethylene glycol dimethyl ether, triethylene glycol monoethyl ether, triethylene glycol diethyl ether, triethylene glycol monopropyl ether, triethylene glycol dipropyl ether, triethylene glycol monobutyl ether, triethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, dipropylene glycol monomethyl ether, dipropylene glycol dimethyl ether, dipropylene glycol monoethyl ether, dipropylene glycol diethyl ether, dipropylene glycol monopropyl ether, dipropylene glycol dipropyl ether, dipropylene glycol monobutyl ether, dipropylene glycol dibutyl ether, tripropylene glycol monomethyl ether, tripropylene glycol dimethyl ether, tripropylene glycol monoethyl ether, tripropylene glycol diethylether, tripropyleneglycol monopropyl ether, tripropylene glycol dipropyl ether, tripropylene glycol monobutyl ether and tripropylene glycol dibutyl ether.

\* \* \* \* \*